US010425335B2

(12) United States Patent
Bhattacharjee et al.

(10) Patent No.: US 10,425,335 B2
(45) Date of Patent: Sep. 24, 2019

(54) RECONSTRUCTING MESSAGE FLOWS BASED ON HASH VALUES

(71) Applicant: SAP SE, Walldorf (DE)

(72) Inventors: Joy Bhattacharjee, Bangalore (IN); Anantharaman Ravi, Singapore (SG); Mohsin Soudagar, Bangalore (IN); Lokesh Chouhan, Bangalore (IN); Raghav Sampath, Bangalore (IN)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 15/708,172

(22) Filed: Sep. 19, 2017

(65) Prior Publication Data

US 2019/0089633 A1    Mar. 21, 2019

(51) Int. Cl.
*H04L 12/743* (2013.01)
*H04L 12/721* (2013.01)
*H04L 12/26* (2006.01)
*H04L 9/06* (2006.01)
*H04L 9/32* (2006.01)

(52) U.S. Cl.
CPC ........ *H04L 45/7453* (2013.01); *H04L 9/0643* (2013.01); *H04L 9/3239* (2013.01); *H04L 43/026* (2013.01); *H04L 43/08* (2013.01); *H04L 45/38* (2013.01)

(58) Field of Classification Search
CPC . H04L 45/7453; H04L 9/3239; H04L 43/026; H04L 9/0643; H04L 43/08; H04L 45/38
See application file for complete search history.

(56) References Cited

U.S. PATENT DOCUMENTS

| 9,588,806 | B2* | 3/2017 | Ginkel | G06F 9/4856 |
|---|---|---|---|---|
| 2010/0233961 | A1* | 9/2010 | Holden | G06F 13/385 |
| | | | | 455/41.3 |
| 2013/0347004 | A1* | 12/2013 | Day | G06F 9/546 |
| | | | | 719/313 |
| 2017/0063880 | A1* | 3/2017 | Freed | H04L 63/1408 |
| 2017/0085481 | A1* | 3/2017 | Park | H04W 4/70 |
| 2017/0230260 | A1* | 8/2017 | Gueta | H04L 43/08 |
| 2018/0019876 | A1* | 1/2018 | Moss | G06F 21/64 |
| 2018/0211064 | A1* | 7/2018 | Ndu | G06F 21/64 |
| 2018/0278623 | A1* | 9/2018 | Koskimies | H04L 29/06 |
| 2019/0109706 | A1* | 4/2019 | Peterson | H04L 9/0825 |

* cited by examiner

*Primary Examiner* — Ivan O Latorre
(74) *Attorney, Agent, or Firm* — Buckley, Maschoff & Talwalkar LLC

(57) ABSTRACT

A hash value is determined based on a payload of a message associated with a first system, the hash value related to a message flow instance that includes the message, wherein the payload associates the message with the message flow instance. Upon sending the message to a second system, generating a first event corresponding to the message, wherein the first event includes the hash value. The first event is sent to a monitoring system. The monitoring system receives a second event including the hash value, wherein the hash value included in the second event is determined in association with the second system. Based on the hash value, a relation is determined to associate the first event and the second event with the message flow instance. The message flow instance is reconstructed based on the determined relation.

16 Claims, 8 Drawing Sheets

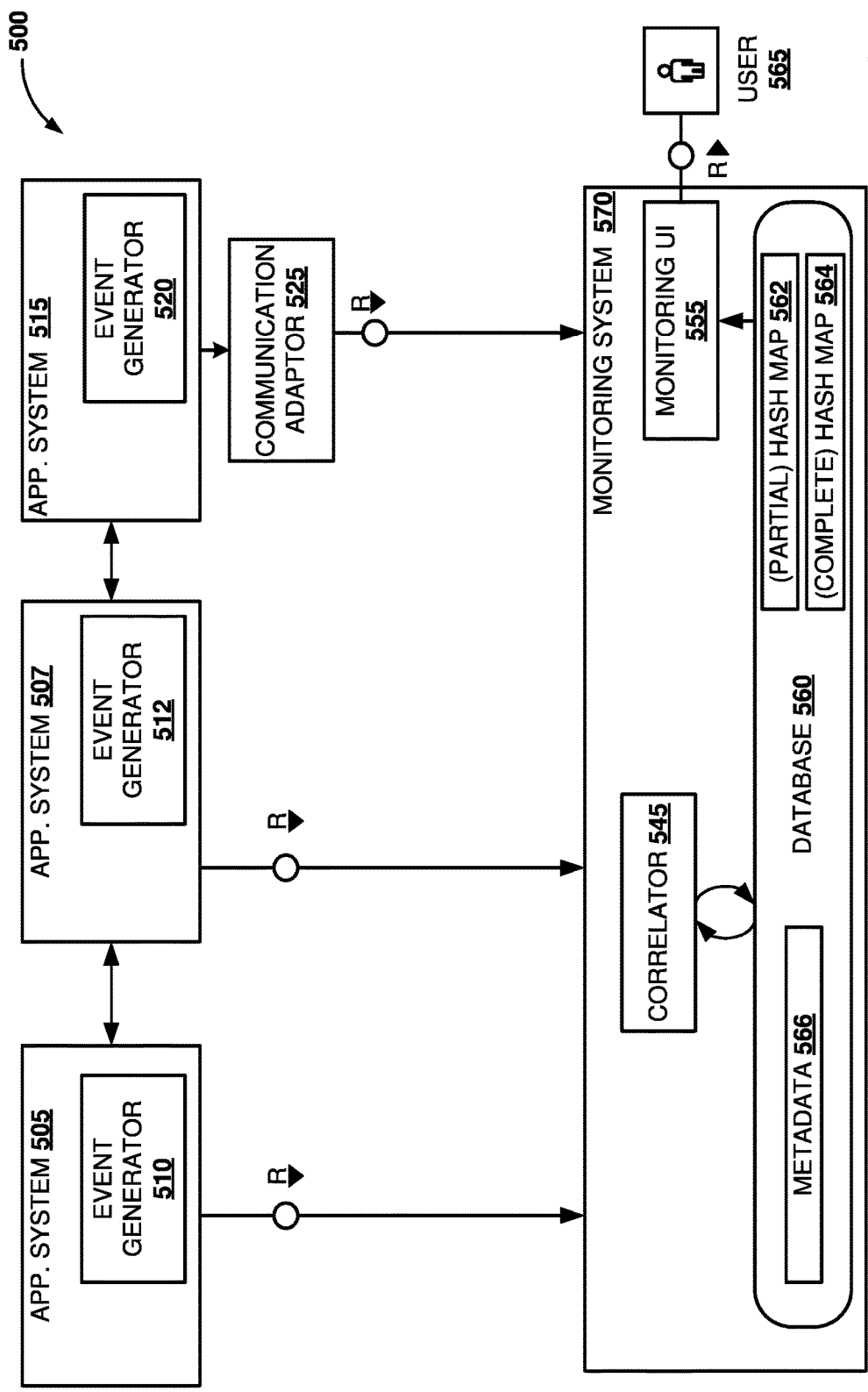

RECONSTRUCTING MESSAGE FLOWS BASED ON HASH VALUES

BACKGROUND

Monitoring data exchange within a network environment allows to investigate and trace abnormal conditions related to systems in the network environment. Status of message flows running between the systems in the network is monitored by message flow monitoring systems that receive and assemble events based on various criteria, thus reconstructing the message flows. To reconstruct or assemble a message flow, a monitoring system selects an event from the received events and traverses other received events looking for other events related to the selected event. The systems send the events to the message flow monitoring system whenever there is message exchange between the systems. In addition, when the events are received asynchronously, the message flow monitoring system should identify incomplete message flows and seek to complete them with the received events. Therefore, performance of the message flow monitoring system may be affected.

Further, when the network environment is heterogeneous, systems are typically configured with different security restrictions and in accordance with various network protocols, and thus, communicate over generic network protocols relying on a payload approach. Assembling message flows that involve such systems is challenging because the generic network protocols do not guarantee uniqueness of message identifiers.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 is a block diagram illustrating a system to reconstruct and validate a message flow instance in a heterogeneous network environment, according to one embodiment.

DETAILED DESCRIPTION

Embodiments of techniques for monitoring message flows through hash maps are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
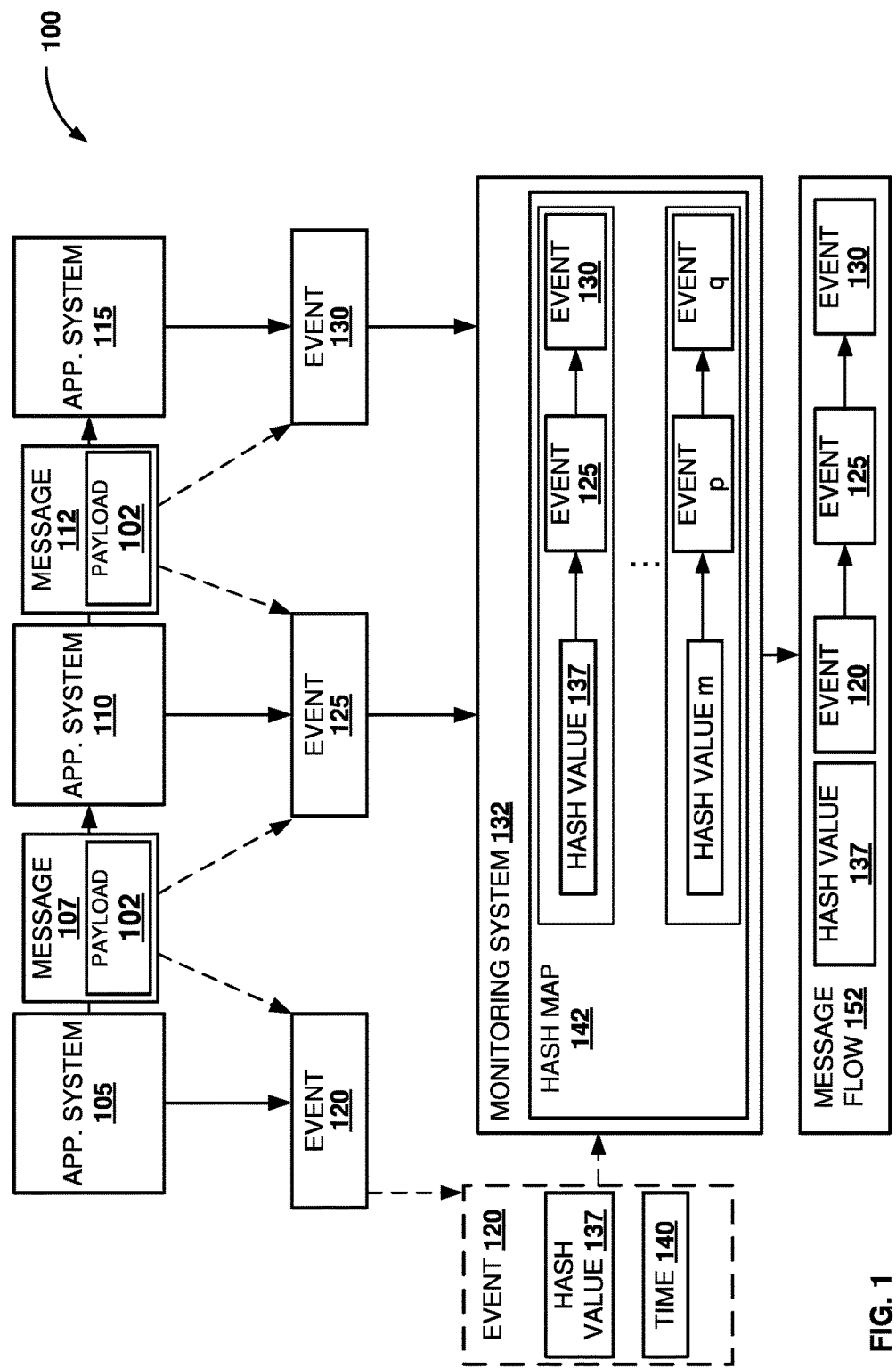
FIG. 1 is a block diagram illustrating a system to reconstruct a message flow instance, according to one embodiment.

FIG. 1 illustrates system 100 to assemble events associated with a number of messages to reconstruct a message flow instance, according to one embodiment. System 100 includes application (app.) system 105, application system 110, application system 115, and monitoring system 132. Application systems 105, 110 and 115 may be software applications that provide one of more of integration of information and processes, collaboration, specific functionality, and scalability. Examples of such applications include, but are not limited to, Enterprise Resource Planning (ERP) applications, Customer Relationship Management (CRM) applications, Supplier Relationship Management (SRM) applications, Supply Chain Management (SCM) applications, and Product Lifecycle Management (PLM) applications. In addition, at least one of the application systems 105, 110 and 115 may be a system that provides a point of integration between the application systems 105, 110 and 115, and facilitates data exchange among the application systems 105, 110 and 115. In one embodiment, the application systems 105, 110 and 115, and the monitoring system 132 are connected via a computer network (not illustrated) such as the Internet or an intranet of an organization. The application systems 105, 110 and 115 may include systems of one organization that communicate over one network protocol within the intranet of the organization, as well as systems of a number of partnering organizations that communicate over various network protocols over the Internet.

In one embodiment, a number of messages such as message 107 and message 112 are exchanged during operation of the application systems 105, 110 and 115. The messages may be related to data transferred between the application systems 105, 110 and 115. For example, the data may be transferred between the application systems 105, 110 and 115 in relation to one or more message flows. A message flow may be initiated to transfer data from the application system 105 through the application system 110 to the application system 115. The message flow may correspond to an action executed and triggered at the application system 105. The message flow may include data for changes across the application system 105, the application system 110, and the application system 115. Thus, the message flow triggered at the application system 105 may execute data changes across the application system 105, the application system 110, and the application system 115. An instance of the message flow may include the message 107 sent from the application system 105 to the application system 110, and the message 112 sent from the application system 110 to the application system 115. An ordered list of messages exchanged between the application systems 105, 110 and 115 in relation to an execution of a message flow can be referred to as an instance of the message flow.

In one embodiment, the messages exchanged among the application systems 105, 110 and 115 include payload 102. The payload 102 includes information to be transferred from the application system 105 through the application system 110 to the application system 115 in relation to a corresponding instance of the message flow running between the application systems. The payload 102 is included in the message 107 and in the message 112. In one embodiment, value of the payload 102 is a combination of symbols that is specific for the corresponding instance of the message flow. The value of the payload 102 remains constant for the corresponding instance of the message flow and is not altered by the application systems that participate in the message flow. Thus, payload 102 included in the message 107 and payload 102 included in the message 112 have equal values. For example, considering an instance of a message flow to book a flight ticket, the payload 102 may include data of a user booking the ticket and may have value "PassengerName="Robert Johnson"; destinationID=NY". The data of the user may be transferred from a web server that received the request from the user to a server of a company operating the flight, as well as to one or more servers of airports where the user is going to board and leave the flight, respectively. Therefore, the data of the user may be included in the payload of a number of messages that is exchanged between the servers in relation to the instance of the message flow. In one embodiment, execution of the instance of the message flow may trigger one or more actions performed by the application systems (e.g., the servers) based on the exchanged messages. For example, based on the received data for the user, the server of the company operating the flight may send a confirmation email to a specified email address of the user or may store the user information in a corresponding database.

In one embodiment, the application systems 105, 110 and 115 are configured to send event notifications (events) to the monitoring system 132 when sending and/or receiving messages. For example, when the application system 105 sends the message 107 to the application system 110, the application system 105 sends a corresponding event 120 to the monitoring system 132. Similarly, the application system 110 sends an event notification to the monitoring system 132 when the message 107 is received. The application system 110 may also sent a notification to the monitoring system 132 when the message 112 is sent to the application system 115. Alternatively, the application system 110 may send a single event notification to the monitoring system 132 upon sending the message 112. For example, the single event notification may include data for the received message (e.g., the message 107) and data for the sent message 112.

In one embodiment, the event 120 is generated by the application system 105 in relation to sending the message 107 to the application system 110. The event 120 is associated with the message 107. In one embodiment, the event 120 includes hash value 137. The hash value 137 is computed based on the payload 102 of the message 107 in accordance with a hashing algorithm. Hashing algorithms generate hash values related to input data. A hash value corresponds to a specific combination of symbols that represents the input data. The hash value is a logical function of the combination of symbols. In one embodiment, the hash value 137 is computed as a logical function of the combination of symbols that represent the value of the payload 102. The hash value 137 uniquely corresponds to the payload 102. The hash value 137 represents a specific signature of the combination of symbols in the payload 102. The hash value 137 uniquely identifies the instance of the message flow that corresponds to the payload 102 among a number of instances of message flows running between the application systems 105, 110, and 115. For example, the hash value 137 may be computed based on value "PassengerName="Robert Johnson"; destinationID=NY" of the payload 102 in accordance with "message digest" 5 (MD5) hashing function/algorithm. In this example, the hash value 137 would be "445CE71CBB13BEAC5F9698DD6B81F944". It should be appreciated that the hash value 137 may be computed based on the payload 102 in accordance with various hashing functions and/or algorithms including, but not limited to, Secure Hash Algorithm 1 (SHA-1), Secure Hash Algorithm 2 (SHA-2), "Fowler—Noll—Vo (FNV) hash" function, "Jenkins hash" function, "Pearson hashing" function, and "Zobrist hashing" function.

Likewise, the application system 110 and the application system 115 generate and push to the monitoring system 132 corresponding event notifications such as event 125 and event 130, respectively. The events 125 and 130, like the event, include hash values and timestamps. The hash values included in the events 125 and 130 are computed by the corresponding application systems 110 and 115 that generate the events 125 and 130. Since the hash values of the events 125 and 130 are computed based on the payload 102 that has equal values in the message 107 and in the message 112, the hash values of the events 125 and 130 correspond to the hash value 137. Thus, based on the corresponding hash values, the event 120 and the events 125 and 130 may be determined to be part of the same instance of the message flow.

The application system 105 may participate in a number of instances of message flows. Therefore, the application system 105 may generate and send a number of messages to the application systems 110 and 115. Respectively, the application system 105 may push a number of event notifications to the monitoring systems 132. The number of event notifications sent by the application system 105 may depend on the number of messages and/or the number of instances of message flows. The event 130 may be pushed by the application system 115 to the monitoring system 132 in relation to receiving and/or processing the message 112. In one embodiment, the event 130 may include an "end" flag (not illustrated) to mark the event 130 as an event notification that is generated in relation to a last message in the corresponding message flow instance. The application system 115 may include the "end" flag in the event 130 when it is determined that the application system 115 is last for the message flow. For example, the message 112 sent to the application system 115 may include a parameter or a property that specifies the application system 115 as a destination system for information transferred by the message flow. Thus, based on the parameter, the application system 115 may include the "end" flag in the event 130.

In one embodiment, the monitoring system 132 receives event notifications, e.g., from the application systems 105, 110 and 115. The monitoring system 132 receives event 120, event 125, and event 130 from the application systems 105, 110 and 115. The events 120-130 are associated with messages that are part of an instance of a message flow. The instance of the message flow transfers data from the application system 105 to the application system 110, and from the application system 110 to the application system 115. In one embodiment, the events 120-130 are received at the monitoring system 132 asynchronously. It should be appreciated, however, that the events 120-130 may be received synchronously at the monitoring system 132.

In one embodiment, the monitoring system 132 receives event 120 from the application system 105. The event 120 includes hash value 137 and timestamp TIME 140. The hash value 137 identifies the event 120 as related to the corresponding instance of the message flow. The timestamp TIME 140 specifies time of generating the event 120 by the application system 105.

In one embodiment, the monitoring system 132 is configured to monitor statuses of instances of message flows executed across the application systems, e.g., application systems 105, 110 and 115. The monitoring system 132 assembles a set of event notifications sent from the application systems 105, 110 and 115 in response to messages exchanged between the application systems 105, 110 and 115, and reconstructs the corresponding instance of the message flow. The monitoring system 132 may be configured to monitor application-to-application (A2A) message flows. In an exemplary scenario, the monitoring system 132 may monitor message flows between systems associated with different organizations. By monitoring the message flows, the monitoring system 132 may provide functionality to investigate instances of message flows reconstructed based on hash values and verify receipt of an order at a given system, check whether a confirmation of the order has been sent from the system, send notifications for errors to support staff, identify root cause of a failed message flow instance, identify issues such as incorrect mapping configuration, etc.

The monitoring system 132 requests event notifications from the application systems. The monitoring system 132 may be polling the application systems for event notifications on a pre-defined time interval (e.g., five seconds). In one embodiment, the monitoring system 132 subscribes for event notifications from the application systems. The monitoring system 132 may send a single request to an application system for continuous receiving of event notifications. In response, the monitoring system 132 receives one or more event notifications.

In one embodiment, the monitoring system 132 stores hash map structure 142. The hash map structure 142 represents an array of hash values. A hash value of the array is mapped to at least one event. By identifying the hash value in the hash map, one or more events associated with the hash value may be accessed. When a set of events is associated with the hash value, a linked list including the set of events is created. The linked list is accessed by identifying the hash value in the hash map. In one embodiment, the hash map structure 142 includes the hash value 137. The hash value 137 is also the hash value received with event 125 and event 130. The events 125 and 130 may be received in the monitoring system 132 before the event 120. As discussed above, the events 120, 125, and 130 are associated with the instance of the message flow. The events 120, 125, and 130 may be received at the monitoring system 132 asynchronously. The events 125 and 130 are pushed by the application systems 110 and 115, respectively, to the monitoring system 132. Consequentially, the events 125 and 130 are appended to the corresponding linked list related to the hash value 137 within the hash map structure 142, based on the hash value 137 of the events 125 and 130.

In one embodiment, based on the hash value 137, the monitoring system 132 determines that the event 120 is part of the instance of the message flow associated with the hash value 137 in the hash map structure 142. Therefore, the monitoring system 132 appends the event 120 to the corresponding set of events. The monitoring system 132 receives events sent from the application systems 105, 110, and 115 when the application systems exchange messages. Since events are sent whenever the application systems exchange corresponding messages, instances of message flows may be reconstructed by the monitoring system 132 based on the events rather than based on the exchanged messages. Thus, the monitoring system 132 assembles ordered lists of events associated with messages exchanged between application systems (e.g., 105, 110 and 115) in relation to instances of message flows. Thus, the monitoring system 132 reconstructs the instances of the message flows based on hash values that correspond to unique combinations of symbols representing the payloads of the instances of the message flows.

In one embodiment, the monitoring system 132 assembles the set of events associated with the hash value 137 from the hash map structure 142 and reconstructs message flow instance 152. The monitoring system 132 may sort/order the events according to timestamps (such as the timestamp TIME 140 of the event 120). For example, the monitoring system 132 determines based on the timestamps that the event 120 was generated before the events 125 and 130. Therefore, the monitoring system 132 orders the events in the message flow instance 152 starting with the event 120. Further, when the monitoring system 132 determines that the event 130 was generated after the events 120 and 125, the monitoring system 132 places the event 130 in the end of the message flow instance 152. Similarly, the monitoring system 132 may determine that the event 125 is generated after the event 120 but before the event 130. Thus, the monitoring system 132 sorts the events in the following sequence: event 120, event 125, event 130 based on timestamps and reconstructs the message flow instance 152.

In one embodiment, the monitoring system 132 checks a destination identifier (DSTID) field (not illustrated) of the event 120 to determine whether the event is associated with an end message in the current message flow instance. For example, an empty DSTID field may be recognized as an "end" flag by the monitoring system 132. In one embodiment, the assembling of the set of events is triggered when an "end" flag is detected.

Figure 2:
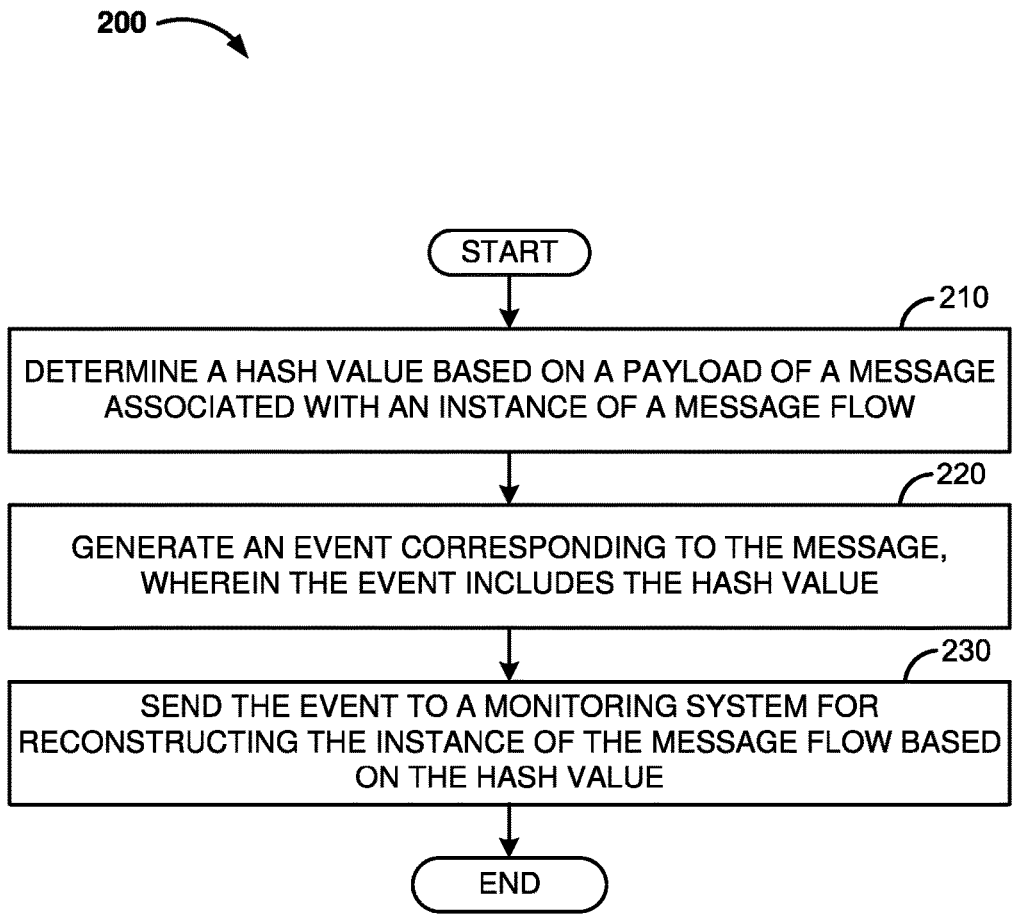
FIG. 2 is a flow diagram illustrating a process to generate an event, according to one embodiment.

FIG. 2 is a flow diagram illustrating a process 200 to generate an event, according to one embodiment. The event is created in relation to a message sent between two systems as part of an instance of a message flow. The event is created as a notification for a data exchange between the two systems. The event may be created by a sending system to notify that the corresponding message has been sent. Alternatively, the event may be created by a receiving system to notify that the corresponding message has been received. In addition, when a system sends and receives messages related to the instance of the message flow, the system may combine sending and receiving notifications in a single event. In such cases when the system receives a first message and sends a second message, the event combining the notifications for received and sent messages is generated when the second message is sent and, respectively, the timestamp of the event represents time of generation of the event by the system.

At 210, a hash value is determined based on a payload of the corresponding message. The hash value corresponds to a specific combination of symbols that represents a value of the payload of the corresponding message. The hash value may be determined as a logical function of the combination of symbols in accordance with a hashing algorithm such as MD5. In one embodiment, the value of the payload remains constant for the corresponding instance of the message flow. That is, the instance of the message flow includes one or more messages that have corresponding payloads with the same value. Thus, the hash value uniquely identifies the instance of the message flow that corresponds to messages with the corresponding payload. In addition, the hash value identifies the event as related to the instance of the message flow. At 220, the event corresponding to the message is generated. The event includes the hash value. In addition, the event includes a timestamp specifying time of generation of the event. At 230, the event is sent to a monitoring system coupled to the two systems. In one embodiment, the monitoring system monitors instances of message flows and reconstructs, based on hash values, the instances of the message flows running between a number of connected systems including the two systems.

Figure 3:
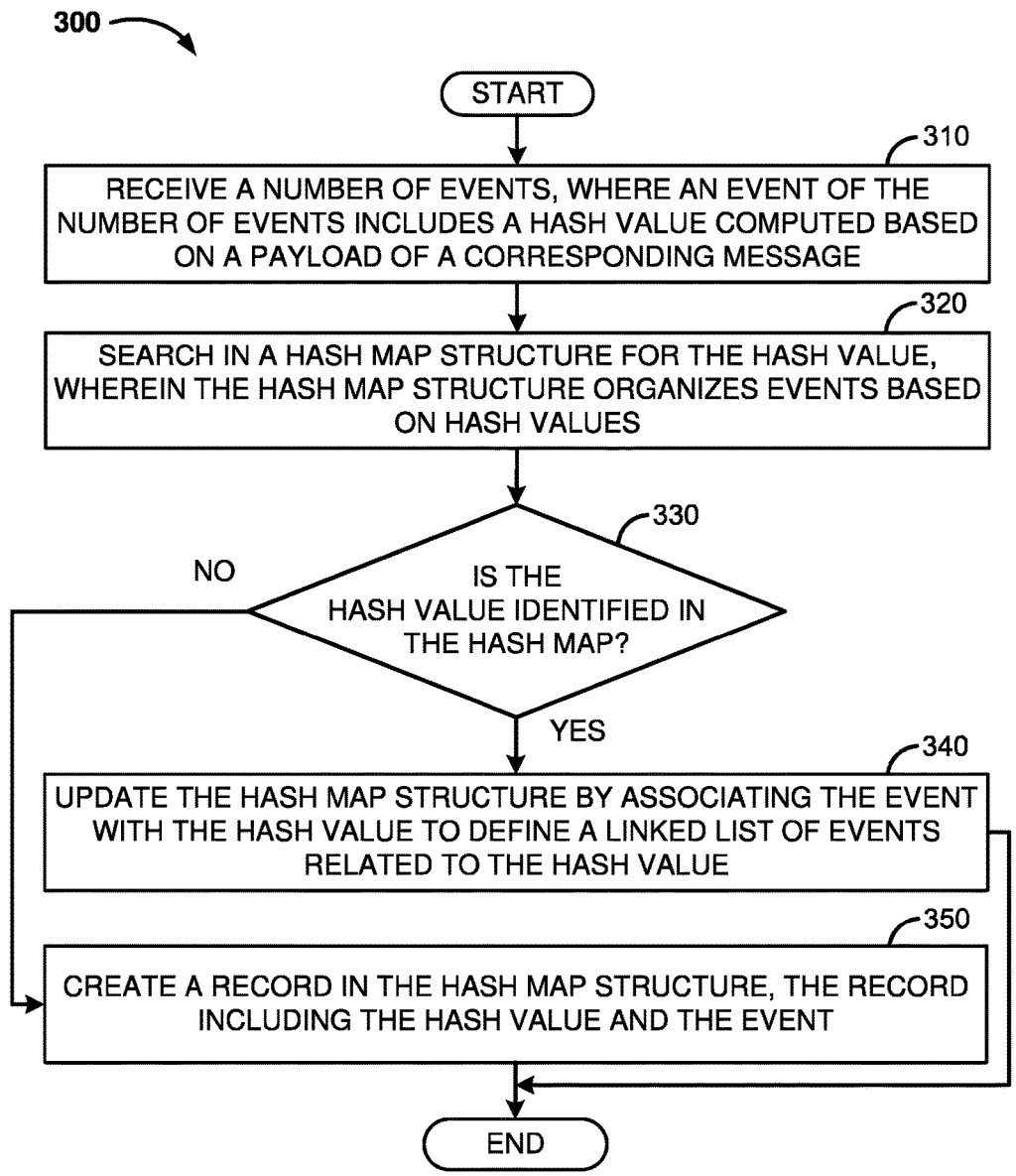
FIG. 3 is a flow diagram illustrating a process to store a received event in a hash map, according to one embodiment.

FIG. 3 is a flow diagram illustrating a process 300 to reconstruct an instance of a message flow based on a set of events, according to one embodiment. At 310, a number of events is received. In one embodiment, a number of systems push the number of events to a monitoring system. Various embodiments may include the number of systems pushing the number of events directly to the monitoring system or via an intermediary such as a network broker or a network storage to optimize the process of reconstructing message flow instances and/or persist the events for an extended period of time while being processed by the monitoring system.

In one embodiment, an event of the number of events includes a hash value. The event may be associated with a message sent from the first system to a second system of the number of systems. The message may be sent as part of an instance of a message flow that runs through the systems and triggers a data exchange via messages. The hash value is computed based on a payload of the corresponding message. For example, a monitoring system such as the monitoring system 132 may request the event from the first system, such as the application system 105, FIG. 1. The event may be pushed to the monitoring system by the first system, when the message is sent. At 320, a search for the hash value is performed in a hash map structure. The hash map structure stores events organized based on hash values. The hash values define the events as corresponding to instances of message flows, as the hash values are calculated based on a payload and the payload is constant throughout the number of messages included in each instance of a message flow, as described earlier.

At 330, it is checked whether the hash value is identified in the hash map structure. For example, the search may be performed in hash map structure 142 described above with reference to FIG. 1. The hash values may be mapped to corresponding sets of events. For example, a hash value may be mapped to one or more linked events. The hash values may be searched based on the hash value of the received event to determine other events corresponding to the instance of the message flow associated with the received event. In such a manner, the searches for events, that are associated with messages transferred between systems and related to same message flow instances, are optimized, as the hash map structure provides searching based on a smaller number of values (e.g., the hash values), rather than, e.g., evaluating all received events during each search.

When the hash value in the hash map structure is identified, at 340, the hash map structure is updated by associating the event with the hash value. Thus, a linked list of events related to the hash value is defined. For example, one or more previously received events may be already appended to the list corresponding to the hash value. By appending the event to the list of linked events corresponding to the identified hash value, the hash map structure is updated to include the received event in the set of previously received events (if present) linked to the hash value. The set of events is associated with the instance of the message flow via the corresponding hash value.

When the hash value is not identified in the hash map structure, at 350, a record including the hash value and the event is created in the hash map structure.

Figure 4:
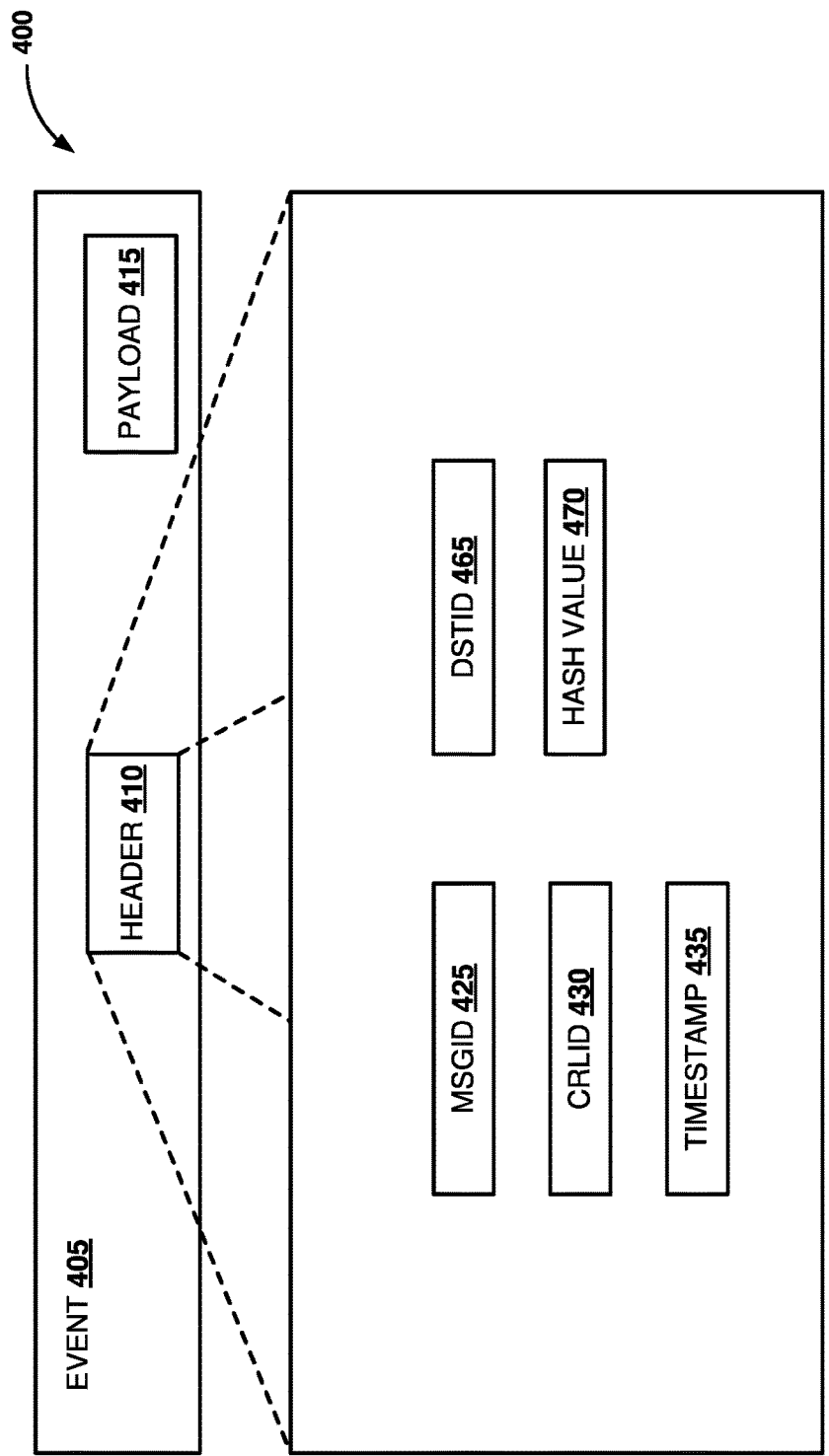
FIG. 4 is a block diagram illustrating an exemplary structure of an event network packet, according to one embodiment.

FIG. 4 illustrates exemplary structure 400 of an event 405, according to one embodiment. The event 405 is a network packet that includes header 410 and payload 415. The event 405 may be such as events discussed in relation to FIG. 1, FIG. 2, and FIG. 3. The event 405 may be created in accordance with a network protocol providing communication between systems that send events (e.g., the application systems 105, 110 and 115) and the monitoring system (e.g., 132). For example, the event 405 may be created in accordance with Advanced Message Queuing Protocol (AMQP). It should be appreciated, however, that the event 405 may be created in accordance with various network protocols that provide message routing functionalities.

In one embodiment, the header 410 includes event properties such as MSGID 425, correlation identifier (CRLID) 430, timestamp 435, destination identifier (DSTID) 465, and hash value 470. The MSGID 425 generated at a system that initiates the instance of the message flow. Value of the MSGID 425 identifies an event as associated with a message. The MSGID 425 value also relates one or more messages having equal values of the MSGID 425 as part of one message flow instance.

In one embodiment, the CRLID 430 defines whether the event is associated with a message that is part of a split scenario message flow instance. A split scenario message flow instance is created when a message (e.g., a parent message) triggers generation of more than one parallel messages (e.g., child messages) to connected systems. For example, the message sent from the first system to the second system may have value "123" for the MSGID 425. The message may trigger generation of two child messages sent from the second system to different systems (e.g., a message from the second system to a third system and a message from the second system to a fourth system). In this case, the message from the second system to the third system may have a different value (e.g., "124") for the message identifier and the message from the second system to the fourth system may also have a different value (e.g., "125") for the message identifier. However, as part of the split scenario message flow instance, the messages from the second system to the third system and from the second system to the fourth system will have correlation identifier with value "123". Thus, the CRLID 430 may associate the child messages (and corresponding events) with the message flow instance of the parent message.

In one embodiment, the timestamp 435 defines time of generation of the event 405. Based on timestamps, events can be sorted chronologically. Destination identifier DSTID 465 defines a destination system for a following message. For example, the message sent from the first system to the second system may include a destination identifier defining the fourth system as a destination system for the following message sent from the second system. Additionally, when the DSTID 465 of the event is empty, it may be determined that there is no subsequent system in the message flow. Thus, the system generating the event may be determined as last system in the message flow. In one embodiment, the empty DSTID 465 field is interpreted as an "end" flag. For example, when the monitoring system 132 described above with reference to FIG. 1 detects the "end" flag, the monitoring system 132 may sort the set of events and construct the message flow instance 152.

In one embodiment, the first system computes a hash value of the payload 415 when the event is generated. The hash value uniquely identifies the message and the corresponding event. The hash value is unique for an instance of a message flow associated with a message for which the event 405 is created. A system participating in the message flow may be configured to compute the hash value based on the payload 415. Based on the hash value 470, a set of events associated with the instance of the message flow may be determined.

In one embodiment, the payload 415 of the event network packet includes data carried by the event 405. The data in the payload 415 may include information specific for a current message flow. Referring to the example of the instance of a message flow to book a flight ticket, FIG. 1, the payload 415 may include data of a user booking the ticket (e.g., passenger name), data for a travel agency facilitating the ticket booking, data for a company operating the flight, data for connections with other flights, booking number, status of the booking, etc.

FIG. 5 illustrates system 500 to reconstruct and validate an instance of a message flow in a heterogeneous network environment, according to one embodiment. In one embodiment, application systems 505, 507 and 515 of system 500 are connected and exchange data through messages. An instance of a message flow may be initiated to transfer data between the application systems 507, 507, and 515. The instance of the message flow may correspond to an action executed and/or triggered at one of the application systems. The instance of the message flow may include a set of messages exchanged between the application systems 505, 507, and 515. An ordered set of the messages exchanged between the application systems 505, 507 and 515 in relation to an execution of a message flow can be referred to as an instance of the message flow.

In one embodiment, monitoring system 570 receives event notifications from the application systems 505, 507 and 515. The application systems 505, 507 and 515 push events to the monitoring system 570 when there is a data exchange between the application systems 505, 507 and 515. The application systems 505, 507, and 515 generate the events in relation to sending and/or receiving messages. An event is associated with one or more messages that are part of an instance of a message flow. One or more of the application systems 505, 507, and 515 may participate in one or more instances of message flows. Therefore, one or more of the application systems 505, 507, and 515 may generate and send one or more messages, e.g., such as the messages 107 and 112 of FIG. 1, to other connected systems. Respectively, one or more events may be pushed by one or more of the application systems 505, 507, and 515 to the monitoring system 570. In one embodiment, the monitoring system 570 receives events asynchronously.

In one embodiment, the application system 505 includes event generator 510. The event generator 510 may be a plug-in module that is installed in the application system 505. Events sent from the application system 505 are generated by the event generator 510. In one embodiment, the event generator 510 is a plug-in module of the monitoring system 570. The event generator 510 extracts message identifiers (if present) and other information (e.g., message properties) from messages sent from and/or received at the application system 505. The event generator 510 appends the extracted message identifiers and other information to corresponding events to be pushed to the monitoring system 570. Further, the event generator 510 appends hash values to the corresponding events. The hash values are computed by the application system 505 based on payloads of the messages that are sent from and/or received at the application system 505.

Similarly, a plug-in module may be installed on other application systems connected to the monitoring system 570. For example, event generator 512 is installed on the application system 507 to establish a connection with the monitoring system 570 and to generate events to be pushed from the application system 507 to the monitoring system 570. The event generator 512 appends message identifiers and other information extracted from exchanged messages to corresponding events. In addition, the event generator 512 appends hash values to the corresponding events. The hash values are computed by the application system 507 based on payloads of the messages that are sent from and/or received at the application system 507.

In one embodiment, the application systems 505, 507, and 515 and the monitoring system 570 are connected in a heterogeneous network environment. For example, the application systems 505 and 507, and the monitoring system 570 may be part of an intranet of an organization, while the application system 515 may communicate with the application systems 505 and 507 over the Internet. In one embodiment, the application system 515 is a third-party application system. Application systems 505 and 507 are configured according to different security restrictions compared to application system 515. Thus, access to the third-party application system 515 may be granted based on different criteria and/or permissions when compared to the application systems 505 and 507 and the monitoring system 570. The application systems 505 and 507 communicate with the third-party application system 515 over a generic network protocol relying on a payload approach. Thus, uniqueness of message identifiers of messages exchanged between the application systems 505 and 507 and the application system 515 may not be guaranteed. Since the application system 515 is a third-party application system, the application system 515 may not be accessible for customization and configuration by users of the monitoring system 570. For example, the application system 515 may not be accessible and, therefore, may not be configured to compute the hash value based on the payload. Therefore, a communication adaptor 525 is installed between the application system 515 and the monitoring system 570. The communication adaptor 525 is connected to the intranet of the organization. The communication adaptor 525 facilitates communication between the monitoring system 570 and the application system 515.

In one embodiment, event generator 520 is installed on the application system 515 to establish a connection with the monitoring system 570. The event generator 520 is configured to generate and send initial events including message payload. The communication adaptor 525 receives the initial events including the message payload from the application system 515. The communication adaptor 525 is part of the intranet of the organization. Thus, the communication adaptor 525 is accessible for customization and configuration by users of the monitoring system 570. The initial events are sent to the communication adaptor by the event generator 520 of the application system 515. The communication adaptor 525 is configured to compute a hash value based on the received payload. For example, the communication adaptor 525 may determine the hash value of the payload according to the MD5 hashing algorithm. The hash value may represent a logical function of a combination of symbols representing the payload. In addition, the communication adaptor 525 is configured to append the hash values to the initial events, thus generating events including the hash values and timestamps. Further, the communication adaptor 525 sends the generated events to the monitoring system 570.

Various embodiments may include one or more services coupled to the application systems such as the application system 515, the one or more services receiving payloads from the application system 515 and calculating hash values based on the payloads. In such cases, instead of being connected to the communication adaptor 525, the application system 515 may directly send events including the calculated hash values to the monitoring to the monitoring system 570.

In one embodiment, the monitoring system 570 includes monitoring user interface (UI) 555 and correlator 545. The monitoring UI 555 provides access to the monitoring system 570 for user 565. The user 565 may access the monitoring UI 555, e.g., through a client (not illustrated). For example, the user 565 accesses the monitoring system 570 through a browser. In various embodiments, the user 565 may access the monitoring system 570 through different types of clients. The clients include, but are not limited to, web browsers, voice browsers, application clients, and other components that may access, consume, and display web content. The monitoring UI 555 communicates with correlator 545 to display reconstructed instances of message flows between the application systems 505, 507 and 515.

In one embodiment, the monitoring system 570 is configured to monitor instances of message flows executed across application systems 505, 507 and/or 515. The monitoring system 570 may provide functionality similar to the functionality of the monitoring system 132 as described above with reference to FIG. 1.

In one embodiment, the correlator 545 compares a hash value of an event with hash values stored in hash map structure 562 in database 560. The hash map structure 562 represents an array of hash values, a hash value mapped correspondingly to one or more events. A hash value of the array is mapped to at least one event. The event may be accessed by identifying the hash value in the hash map structure 562. When a set of events is associated with one hash value, a linked list including the set of events is created. The linked list is accessed by identifying the hash value in the hash map structure. In one embodiment, the hash map structure 562 stores one or more hash values associated with partially reconstructed (e.g., incomplete) instances of message flows. When the correlator 545 determines that the hash value of the event is among the hash values stored in the hash map structure 562, the correlator 545 appends the event to the hash value in the hash map structure 562 to create or add to the set of events for an instance of the message flow related to the hash value, e.g., as described above with reference to FIG. 1, FIG. 2, and FIG. 3. When an instance of a message flow is reconstructed, the correlator 545 may store the instance of the message flow in hash map structure 564. The hash map structure 564 stores completely reconstructed instances of message flows, according to one embodiment.

In one embodiment, the database 560 stores metadata 566. The metadata 566 includes metadata records for a number of message flows that run between the application systems. A metadata record for a message flow associates a set of systems from the number of connected systems with the message flow. The set of systems represents a list of systems that may participate in a message flow. Systems of the set of systems generate and send events related to the message flow.

In one embodiment, the monitoring system 570 may validate an instance of a message flow based on the list of systems in the metadata 566. For example, an instance of the message flow may be successfully validated when an event has been received from each system that is on the list. Thus, the monitoring system 570 determines the instance of the message flow is completely reconstructed. Similarly, the monitoring system 570 determines the instance of the message flow is partially reconstructed (e.g., not completed) when an event is still expected from one or more of the systems on the list. Various embodiments may include such metadata for systems participating in a message flow being automatically collected or acquired by the monitoring system 570, as well as readily received from another source or configured in the monitoring system by a user or an application system. In one embodiment, the user 565 may monitor one or more instances of message flows that include messages exchanged over a number of systems in relation to a number of instances of message flows. By monitoring instances of message flows, the user 565 may investigate and trace the instances of the message flows on a single-message level. Thus, a system that caused failure of a message flow instance may be identified and detailed analysis of the system may be performed.

Figure 6A:
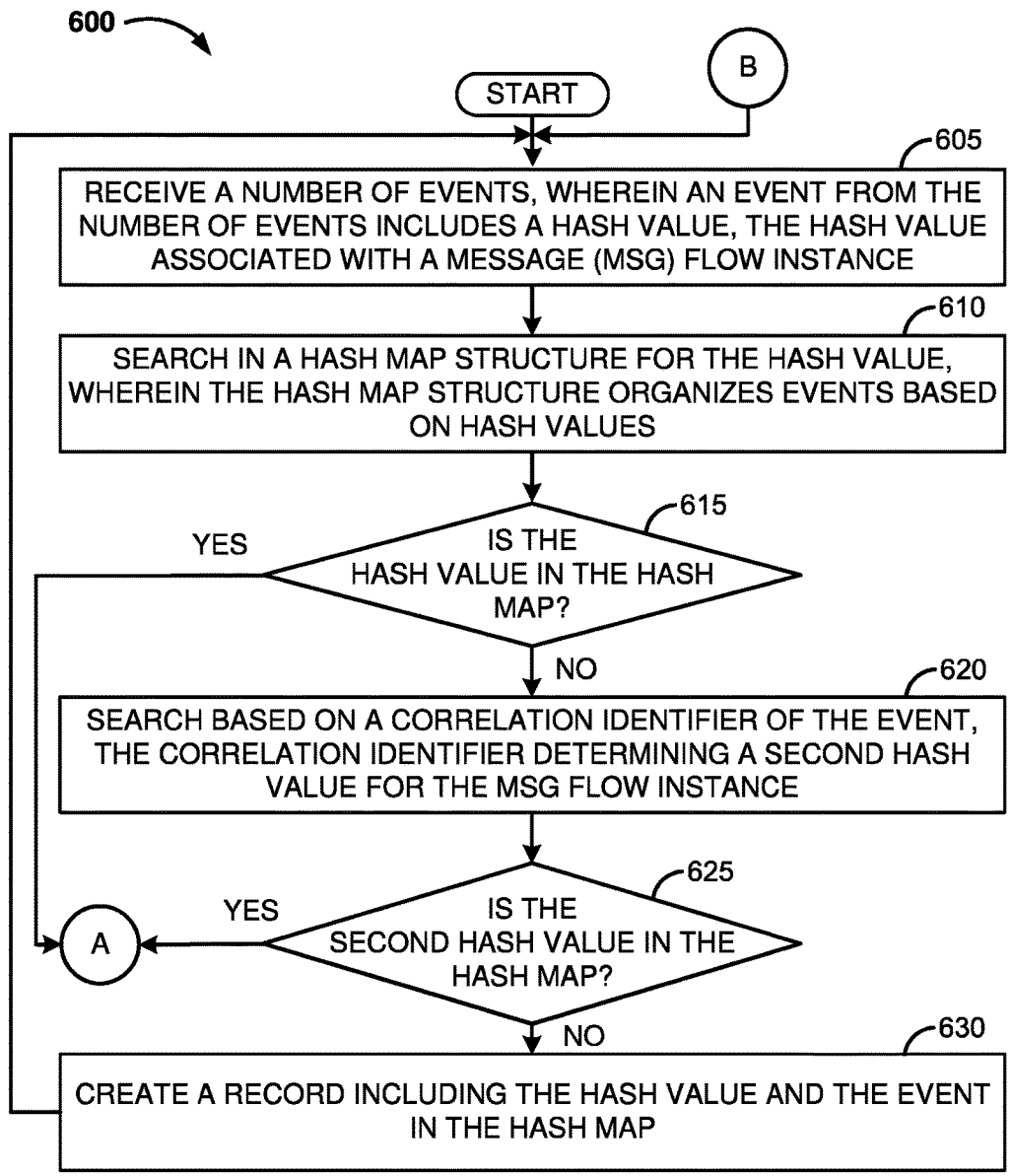
FIGS. 6A-6B are flow diagrams illustrating a process to reconstruct and validate a message flow instance, according to one embodiment.
Figure 6B:
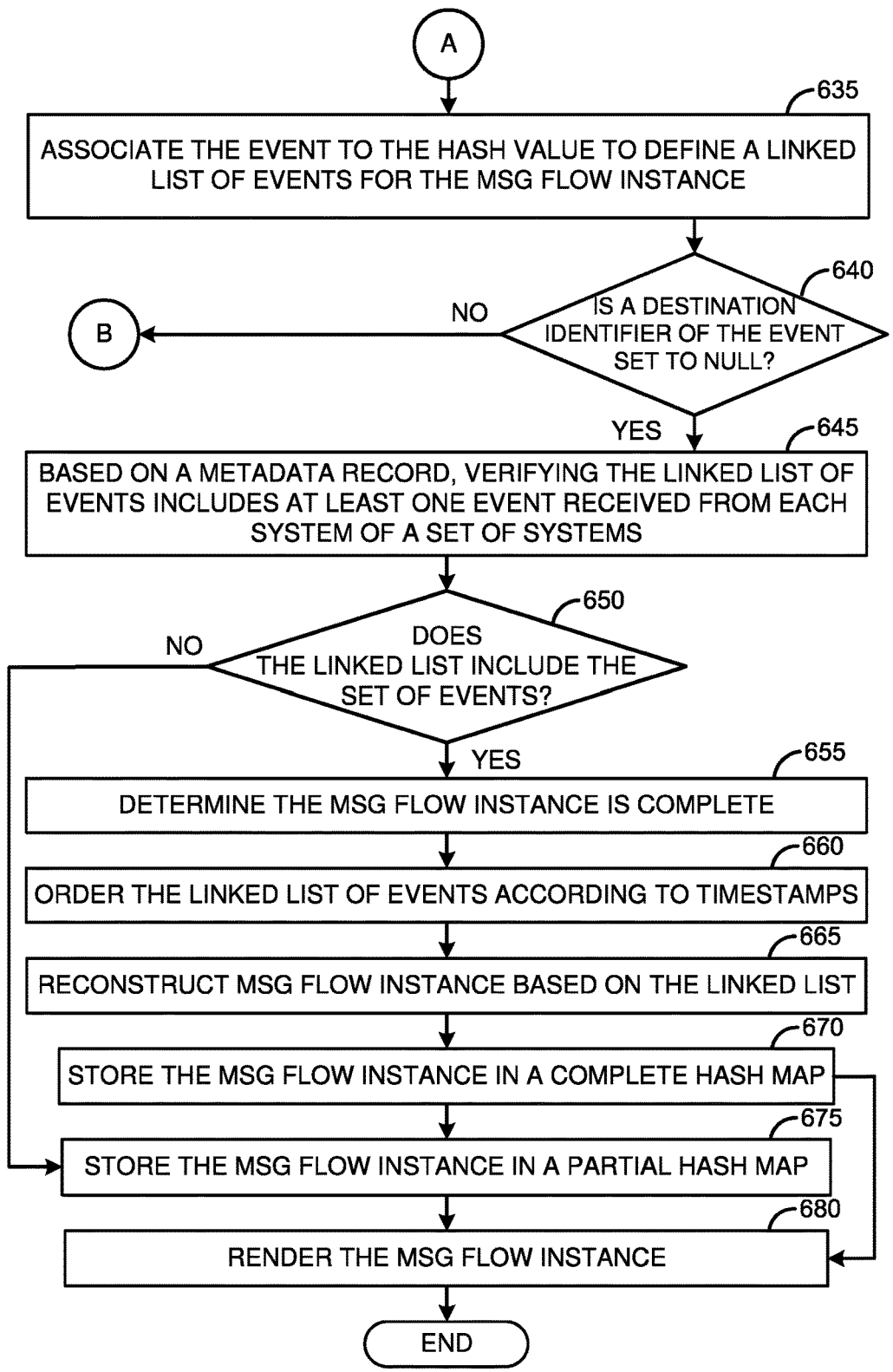

FIGS. 6A and 6B illustrate process 600 to reconstruct and validate an instance of a message flow, according to one embodiment. At 605 (FIG. 6A) a number of events is received. An event from the number of events includes a hash value of a message flow instance. In one embodiment, the event includes various properties in addition to the hash value. For example, the event may include a timestamp, a CRLID, a DSTID, additional metadata, etc. as described above with reference to FIG. 4.

At 610, a search for the hash value is performed in a hash map structure. The hash map structure organizes events based on one or more hash values. The hash map structure may be stored in database 560 of FIG. 5. At 615, a check is performed to determine whether the hash value of the event is included in the one or more hash values. When the hash value is identified, the process continues at step 635 (FIG. 6B). When the hash value is not identified in the one or more hash values, at 620, a search based on the CRLID of the event is performed in the one or more hash values. The CRLID defines the event is associated with a message that is part of a split scenario message flow instance. A split scenario message flow instance is created when a message (e.g., a parent message) triggers generation of more than one parallel messages (e.g., child messages) between connected systems. The CRLID associates the child messages (and corresponding events) with the message flow instance of the parent message.

At 625, a check is performed to determine whether the CRLID value matches with a value of the one or more hash values. When such a hash value is identified, the process continues at step 635 (FIG. 6B). When such a hash value with value matching the CRLID value is not identified in the one or more hash values, at 630, a new record is created in the hash map structure. The new record including the hash value of the event and the event. When the new entry/record is created in the hash map structure, the process returns to 605.

At 635 (FIG. 6B), when the hash value is determined, the event is associated with the hash value. Based on the association, a linked list of events is defined for the message flow instance being monitored. The hash value is associated with a set of events related to the corresponding message flow instance. At 640, a check is performed to determine whether the DSTID of the event has value "null". When the value of the DSTID is not "null", the event is not related to an end message in the message flow instance and, thus, process 600 returns to step 605. When the value of the DSTID is "null", it is determined that the event is related to the end message in the message flow instance. Therefore, at 645, it is verified that the linked list of events includes a set of events that is correspondingly received from the set of systems participating in the message flow instance.

The verification is performed based on a metadata record. The metadata record associates a set of systems from a number of connected systems with a message flow. The set of systems represents a list of systems that may participate in a message flow instance. At 650, a check is performed to determine whether the linked list includes at least one event received from each system of the set of systems. Upon determining that an event was received from each system from the set of systems, at 655, it is determined the message flow instance is complete. At 660, the linked list of events is ordered chronologically based on timestamps and, 665, the message flow instance is reconstructed based on the linked list. The reconstructed message flow instance is stored, at 680, in a "complete" hash maps structure that stores completely reconstructed message flow instances.

Similarly, when the monitoring system 570 determines the message flow instance is not complete (e.g., when an event is still expected from one or more of the systems from the set of systems), at 675, the message flow instance is stored in a "partial" hash map structure that stores partially reconstructed message flow instances. At 680, message flow instances are rendered for monitoring. For example, the message flows instances may be monitored on the monitoring UI 455 of FIG. 4.

Described is a message flow monitoring system for efficient reconstruction and monitoring of instances of message flows between application systems that communicate over various network protocols. The event notifications are assembled in hash maps based on hash values computed based on payloads of corresponding messages. The hash values uniquely identify instances of message flows corresponding to the messages. The hash maps ensure fast searching based on identifiers. A hash map is a data structure representing an array of indices mapped to a number of values. An index of the array of indices is mapped to a value of the number of values. The value may represent data associated with the index that may be accessed by identifying the index in the hash map. Considering a hash value of an event as the index and the event as the value, a hash map structure storing one or more indices mapped to one or more values may be created. When a set of events is associated with the hash value, a linked list including the set of events may be created. The set of events may be accessed by identifying the hash value in the hash map. Further, the hash values computed based on messages' payloads identify the events as part of the corresponding message flow instances.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
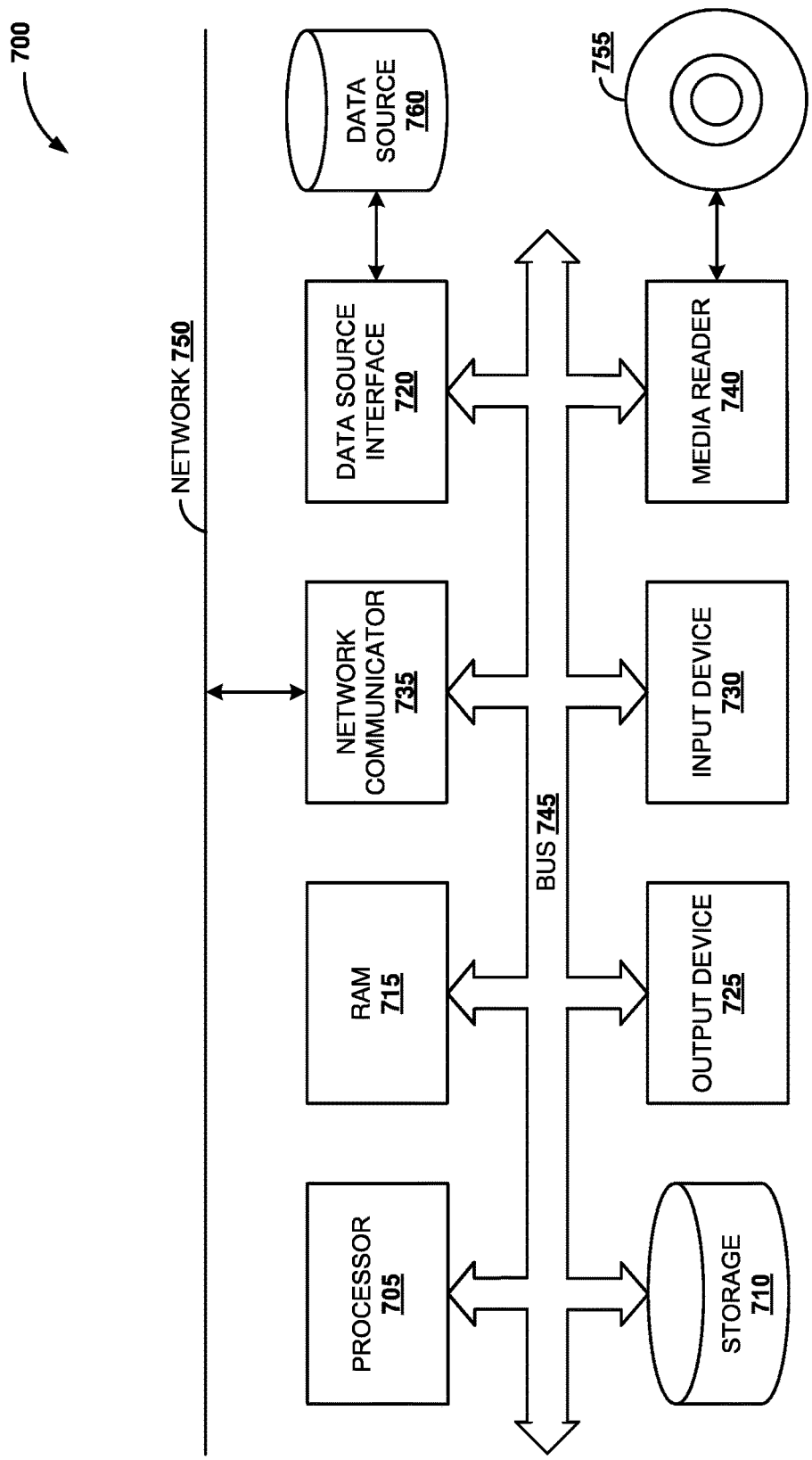
FIG. 7 is a block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to reconstruct message flows running in heterogeneous network environments, the method comprising:
   determining a hash value for a payload of a message, wherein the message is associated with a first system, and wherein the payload associates the message with an instance of a message flow;
   upon sending the message to a second system, generating a first event corresponding to the message, wherein the first event comprises the hash value;
   sending the first event to a monitoring system;
   at the monitoring system,
      receiving a second event comprising the hash value, wherein the hash value included in the second event is determined in association with the second system;
      based on the hash value, determining a relation to associate the first event and the second event with the message flow instance;
      reconstructing the message flow instance based on the determined relation; and
      receiving a plurality of events comprising the first event and the second event, the plurality of events received in relation to a plurality of instances of the message flows, wherein execution of the plurality of the instances of the message flows triggers one or more actions at the first system and at the second system.

2. The method of claim 1, wherein the hash value included in the second event is computed based on the payload of the message.

3. The method of claim 1, wherein determining, based on the payload of the message associated with the first system, the hash value related to the message flow instance further comprises:
   computing the hash value based on the payload according to a hashing algorithm.

4. The method of claim 1, wherein receiving the second event further comprises:
   at a communication adaptor, receiving an initial event comprising the payload of the message from the second system;
   computing the hash value based on the payload included in the initial event according to a hashing algorithm; and
   generating the second event comprising the hash value.

5. The method of claim 1, wherein reconstructing the message flow instance based on the determined relation by assembling the first event and the second event further comprises:
   searching for the hash value in a hash map structure that organizes events based on hash values;
   when the hash value is missing in the hash map structure, creating a record in the hash map structure, wherein the record comprises the hash value and the first and the second event; and
   when the hash value is identified at the hash map structure, associating the first event and the second event with the hash value to define a linked list of events associated with the message flow instance.

6. A computer implemented method to reconstruct message flows running in heterogeneous network environments, the method comprising:
   determining a hash value for a payload of a message, wherein the message is associated with a first system, and wherein the payload associates the message with an instance of a message flow;

upon sending the message to a second system, generating a first event corresponding to the message, wherein the first event comprises the hash value;

sending the first event to a monitoring system;

at the monitoring system,
- receiving a second event comprising the hash value, wherein the hash value included in the second event is determined in association with the second system;
- based on the hash value, determining a relation to associate the first event and the second event with the message flow instance; and
- reconstructing the message flow instance based on the determined relation by assembling the first event and the second event, wherein the reconstructing further comprises:
  - searching for the hash value in a hash map structure that organizes events based on hash values;
  - when the hash value is missing in the hash map structure, creating a record in the hash map structure, wherein the record comprises the hash value and the first and the second event; and
  - when the hash value is identified at the hash map structure, associating the first event and the second event with the hash value to define a linked list of events associated with the message flow instance; and
- when an event from the linked list of events is associated with an end message from the message flow instance:
  - based on a metadata record that associates a set of systems with the message flow instance, verifying that the linked list of events comprises at least one event received from each system of the set of systems, wherein the set of systems comprises the first system and the second system;
  - ordering the linked list of events to reconstruct the message flow instance; and
  - rendering the reconstructed message flow instance to investigate the message flow instance.

7. A computer system to reconstruct message flows running in heterogeneous network environments, the system comprising:
- a processor; and
- a memory in association with the processor storing instructions related to: a first system to:
  - determine a hash value for a payload of a message, wherein the message is associated with the first system, and wherein the payload associates the message with an instance of a message flow;
  - upon sending the message to a second system, generate a first event corresponding to the message, wherein the first event comprises the hash value;
  - send the first event to a monitoring system;
- a communication adaptor to:
  - receive an initial event associated with the second system, wherein the initial event comprises the payload of the message;
  - compute, according to a hashing algorithm, the hash value based on the payload included in the initial event; and
  - generate a second event, wherein the second event comprises the hash value computed based on the payload included in the initial event; and
- a monitoring system to:
  - receive the second event;
  - based on the hash value, determine a relation to associate the first event and the second event with the message flow instance; and
  - reconstruct the message flow instance based on the determined relation wherein the monitor system comprises a correlator to:
- search for the hash value in a hash map structure that organizes events based on hash values;
- when the hash value is missing in the hash map structure, creating a record in the hash map structure, wherein the record comprises the hash value and the first and the second event; and
- when the hash value is identified in the hash map structure, associating the first event and the second event with the hash value to define a linked list of events associated with the message flow instance; and wherein the correlator:
- determines the hash value is missing in the hash map structure; and
- searches in the hash map structure for a value corresponding to a correlation identifier (CRLID) associated with the first event, wherein the CRLID associates the first message with a parent message flow by defining a parent hash value for the parent message flow.

8. A computer system to reconstruct message flows running in heterogeneous network environments, the system comprising:
- a processor; and
- a memory in association with the processor storing instructions related to: a first system to:
  - determine a hash value for a payload of a message, wherein the message is associated with the first system, and wherein the payload associates the message with an instance of a message flow;
  - upon sending the message to a second system, generate a first event corresponding to the message, wherein the first event comprises the hash value;
  - send the first event to a monitoring system;
- a communication adaptor to:
  - receive an initial event associated with the second system, wherein the initial event comprises the payload of the message;
  - compute, according to a hashing algorithm, the hash value based on the payload included in the initial event; and
  - generate a second event, wherein the second event comprises the hash value computed based on the payload included in the initial event; and
- a monitoring system to:
  - receive the second event;
  - based on the hash value, determine a relation to associate the first event and the second event with the message flow instance; and
  - reconstruct the message flow instance based on the determined relation;

wherein the monitoring system comprises a correlator to:
- search for the hash value in a hash map structure that organizes events based on hash values;
- when the hash value is missing in the hash map structure, creating a record in the hash map structure, wherein the record comprises the hash value and the first and the second event; and
- when the hash value is identified in the hash map structure, associating the first event and the second event with the hash value to define a linked list of events associated with the message flow instance; and wherein the correlator evaluates a destination identifier (DSTID) comprised in an event from the linked list to determine whether the event from the linked list is associated with an end message from the message flow instance.

9. The system of claim 8, wherein, when the event from the linked list is associated with the end message from the message flow instance, the correlator:
  verifies, based on a metadata record that associates a set of systems with the message flow instance, that the linked list comprises at least one event received from each system of the set of systems, wherein the set of systems comprises the first system and the second system;
  orders the linked list of events to reconstruct the message flow instance; and
  renders the reconstructed message flow instance to investigate the message flow instance.

10. A non-transitory computer readable medium storing instructions which when executed by at least processor cause a computer system to perform operations comprising:
  determine a hash value based on a payload of a message, wherein the payload associates the message with a message flow instance;
  generate an event corresponding to the message, wherein the event comprises the hash value;
  send the event to a monitoring system for reconstructing, based on the hash value, the message flow instance; and
  receive, at the monitoring system, a plurality of events comprising the event, the plurality of events received in relation to a plurality of instances of message flows, wherein execution of the plurality of the instances of the message flows triggers one or more actions at a plurality of systems associated with the plurality of the instances of the message flows.

11. The computer readable medium of claim 10, wherein determining the hash value comprises:
  receive an initial event associated with an exchange of the message, wherein the initial event comprises the payload of the message; and
  compute the hash value based on the payload from the initial event according to a hashing algorithm.

12. The computer readable medium of claim 11, wherein generating the event comprises:
  append the hash value to the initial event.

13. The computer readable medium of claim 10, further storing instructions to:
  search in a hash map structure for the hash value;
  when the hash value is missing in the hash map structure, create a record in the hash map structure, wherein the record comprises the hash value and the event; and
  when the hash value is identified at the hash map structure, associate the event with the hash value to define a linked list of events associated with the message flow instance.

14. A non-transitory computer readable medium storing instructions which when executed by at least processor cause a computer system to perform operations comprising:
  determine a hash value based on a payload of a message, wherein the payload associates the message with a message flow instance;
  generate an event corresponding to the message, wherein the event comprises the hash value;
  send the event to a monitoring system for reconstructing, based on the hash value, the message flow instance;
  search in a hash map structure for the hash value;
  when the hash value is missing in the hash map structure, create a record in the hash map structure, wherein the record comprises the hash value and the event; and
  when the hash value is identified at the hash map structure, associate the event with the hash value to define a linked list of events associated with the message flow instance;
  determine the hash value is missing in the hash map structure; and
  search in the hash map structure for a value corresponding to a correlation identifier (CRUD) associated with the event, wherein the CRUD associates the message with a parent message flow instance by defining a parent hash value for the parent message flow instance.

15. The computer readable medium of claim 14, further storing instructions to:
  evaluate a destination identifier (DSTID) comprised in the event to determine whether the event is associated with an end message from the message flow instance.

16. The computer readable medium of claim 15, further storing instructions to: when the event is associated with the end message from the message flow instance:
  based on a metadata record that associates a set of systems with the message flow instance, verify that the linked list comprises at least one event received from each system of the set of systems;
  determine the message flow instance is completely executed;
  order the linked list to reconstruct the message flow instance; and
  render the reconstructed message flow instance to investigate the message flow instance.

* * * * *